US007639753B2

(12) United States Patent
Uchikawa et al.

(10) Patent No.: US 7,639,753 B2
(45) Date of Patent: Dec. 29, 2009

(54) RECEIVING APPARATUS AND DEMODULATING METHOD

(75) Inventors: Hironori Uchikawa, Kawasaki (JP); Kohsuke Harada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 11/385,835

(22) Filed: Mar. 22, 2006

(65) Prior Publication Data
US 2006/0222121 A1 Oct. 5, 2006

(30) Foreign Application Priority Data
Mar. 31, 2005 (JP) ............................. 2005-101245

(51) Int. Cl.
H04B 7/02 (2006.01)
(52) U.S. Cl. ..................................................... 375/267
(58) Field of Classification Search ................. 375/260, 375/347, 267, 299; 714/752, 758
See application file for complete search history.

(56) References Cited

U.S. PATENT DOCUMENTS

| 7,389,464 B2 * | 6/2008 | Jeong et al. ................. 714/752 |
| 2006/0005104 A1 | 1/2006 | Harada |
| 2007/0140377 A1 * | 6/2007 | Murakami et al. .......... 375/299 |

FOREIGN PATENT DOCUMENTS

JP         2003-32226         1/2003

OTHER PUBLICATIONS

Won-Joon Choi, et al., "Iterative Soft Interference Cancellation for Multiple Antenna Systems", IEEE Wireless Communications and Networking Conference, vol. 1, Sep. 2000, pp. 304-309.

P. W. Wolniansky, et al. "V-Blast: An Architecture for Realizing Very High Data Rates Over the Rich-Scattering Wireless Channel", Proceeding of ISSSE-98, Pisa, Italy, Sep. 29, 1998, 6 Pages.
Kiyotaka Kobayashi, et al., "Varying Interleave Patterns with Iterative Decoding for Improved Performance in Mimo Systems", Personal Indoor and Mobile Radio Communications PIMRC, IEEE, vol. 2, 2004, pp. 1429-1433.

* cited by examiner

Primary Examiner—David C Payne
Assistant Examiner—Leon-Viet Q Nguyen
(74) Attorney, Agent, or Firm—Oblon, Spivak, McClelland, Maier & Neustadt, L.L.P.

(57) ABSTRACT

Receiving-apparatus employed in MIMO-system includes space-filtering-unit configured to separate receive-signals to signal of first-data-sequence and signal of second-data-sequence on basis of estimation result, provisional-decoding-unit configured to LDPC-decode signal of first-data-sequence and signal of second-data-sequence with check-matrices which is modified in different-forms by fundamental-row-operation from each other, to obtain provisional-likelihood-ratio for first-data-sequence and second-data-sequence, provisional-output-unit configured to output provisional-first-data-sequence and provisional-second-data-sequence on the basis of provisional-likelihood-ratio for first-data-sequence and second-data-sequence respectively, replica-signal-generation-unit configured to generate replica-signal, on basis of provisional-first-data-sequence and provisional-second-data-sequence and estimation-result of propagation-path-estimation-unit, soft-decision-outputting-unit configured to obtain receive-likelihood-values of first-data-sequence and second-data-sequence, on basis of residual-signal obtained by subtracting replica-signal from receive-signals, actual-decoding-unit configured to LDPC-decode receive-likelihood-values, by using the check-matrices, to obtain likelihood-ratio of first-data-sequence and likelihood-ratio of second-data-sequence, and actual-output-unit configured to obtain first-data-sequence and second-data-sequence on the basis of likelihood-ratio of first-data-sequence generated by the actual-decoding-unit and likelihood-ratio of second-data-sequence to hard-decision.

24 Claims, 5 Drawing Sheets

FIG. 1

$$\begin{bmatrix} 10010110 \\ 01101100 \\ 01010011 \\ 10101001 \end{bmatrix}$$

$$\begin{bmatrix} 10010110 \\ 11111010 \\ 01010011 \\ 00111111 \end{bmatrix}$$

RECEIVING APPARATUS AND DEMODULATING METHOD

CROSS-REFERENCE TO RELATED APPLICATIONS

This application is based upon and claims the benefit of priority from prior Japanese Patent Application No. 2005-101245, filed Mar. 31, 2005, the entire contents of which are incorporated herein by reference.

BACKGROUND OF THE INVENTION

1. Field of the Invention

This invention relates to a receiving apparatus and demodulating method used in a Multi-Input Multi-Output (MIMO) system.

2. Description of the Related Art

A Multi-Input Multi-Output (MIMO) system is configured to receive a transmit signal which is transmitted with the same frequency at the same time from a plurality of transmitting apparatuses, by a receiving apparatus having a plurality of antennas. As methods of separating signals transmitted from the respective transmitting apparatuses from the receive signals, in this system, receiving schemes such as a spatial filtering and a sequential decision and decoding are known (for example, P. W. Wolniansky, G. J. Foschini, G. D. Golden, R. A. Valenzuela, "V-BLAST: An Architecture for Realizing Very High Data Rates Over the Rich-scattering Wireless Channel" invited paper, Proc. ISSSE-98, Pisa, Italy, Sep. 29, 1998).

In the MIMO system, signals are transmitted from a plurality of transmitting apparatuses after transmission sequences of the respective transmitting apparatuses are subjected to error-correcting-coding. In the receiving apparatus, the transmit signals are received with antennas whose number is equal to or greater than the number of the transmitting apparatuses, and propagation path H for each of the antennas is estimated on the basis of a pilot signal inserted into the signal received by each antenna.

The propagation path H thus estimated is expressed as a 2×2 matrix if, for example, two transmitting apparatuses exist and two receiving antennas exist. The spatial filtering is a method by which the transmitted signals are obtained by multiplying an inverse matrix of the propagation path H thus obtained by the receive signals and then subjected to error-correcting-coding, to obtain the transmission sequences.

The sequential decision and decoding is a method by which a replica signal is formed by multiplying one of the transmit signals obtained from the spatial filtering by the propagation path matrix, fed back to the receive signals before subjected to the spatial filtering, and subtracted from the receive signals, to improve the demodulation performance of the other transmit signal.

If propagation paths have a high correlation, however, the signals cannot be separated at high accuracy by the spatial filtering. In this case, the receiving performance cannot be improved even if the replica signal is fed back by the sequential decision and decoding.

In the prior art, the transmit signals of the respective transmitting apparatuses have been interleaved in different patterns to reduce the characteristic degradation resulting from spatial correlation (for example, Jpn. Pat. Appln. KOKAI No. 2003-32226 and Murakami et al. "Review of application of interleaving of iterative decoding using deletion of signal points in the MIMO system" Shingaku-Giho RCS 2004-8). However, since a large memory has been required for application of such interleaving, it has complicated configuration of the transmitting apparatuses and receiving apparatuses and prevented downsizing and low power consumption of the apparatuses.

BRIEF SUMMARY OF THE INVENTION

An object of the present invention is to provide a downsized and low-power receiving apparatus and a demodulating method capable of preventing the characteristic degradation resulting from spatial correlation without interleaving.

An aspect of the present invention provides a receiving apparatus employed in a Multi-Input Multi-Output (MIMO) system in which a first data sequence and a second data sequence are encoded with Low Density Parity Check (LDPC) codes and transmitted via different antennas. The receiving apparatus comprises a propagation path estimation unit configured to estimate propagation paths of a plurality of receive signals received via different antennas, using the receive signals, a space filtering unit configured to separate the receive signals to a signal of a first data sequence and a signal of a second data sequence on the basis of an estimation result of the propagation path estimation unit, a provisional decoding unit configured to LDPC-decode the signal of the first data sequence and the signal of the second data sequence with check matrices which is modified in different forms by fundamental row operation from each other, to obtain a provisional likelihood ratio for the first data sequence and the second data sequence, respectively, a provisional output unit configured to output provisional first data sequence and provisional second data sequence on the basis of the provisional likelihood ratio for the first data sequence and the second data sequence, respectively, a replica signal generation unit configured to generate a replica signal, on the basis of the provisional first data sequence and the provisional second data sequence and the estimation result of the propagation path estimation unit, a soft decision outputting unit configured to obtain receive likelihood values of the first data sequence and the second data sequence, respectively, on the basis of a residual signal obtained by subtracting the replica signal from the receive signals, a actual decoding unit configured to LDPC-decode the receive likelihood values, by using the check matrices, respectively, to obtain a likelihood ratio of the first data sequence and a likelihood ratio of the second data sequence, and an actual output unit configured to obtain the first data sequence and the second data sequence on the basis of the likelihood ratio of the first data sequence and the likelihood ratio of the second data sequence generated by the actual decoding unit, respectively.

DETAILED DESCRIPTION OF THE INVENTION

Embodiments of the present invention will be explained below with reference to the accompanying drawings. For simple explanation of the gist of the present invention, 2×2 MIMO (i.e. MIMO with two antennas on the transmitting side and two antennas on the receiving side) will be taken as an example. However, the present invention can be implemented irrespective of the number of antennas if the number of antennas on the receiving side is equal to or greater than that on the transmitting side.

The transmitting apparatus subjects the signal to Low Density Parity Check (LDPC) encoding for each transmission sequence, modulates the LDPC-encoded signal in the same or different manners for each stream, subjects the signal to space multiplexing and transmits the signal. The unit of the transmit signal multiplexed by the MIMO communication is called stream.

Figure 1:
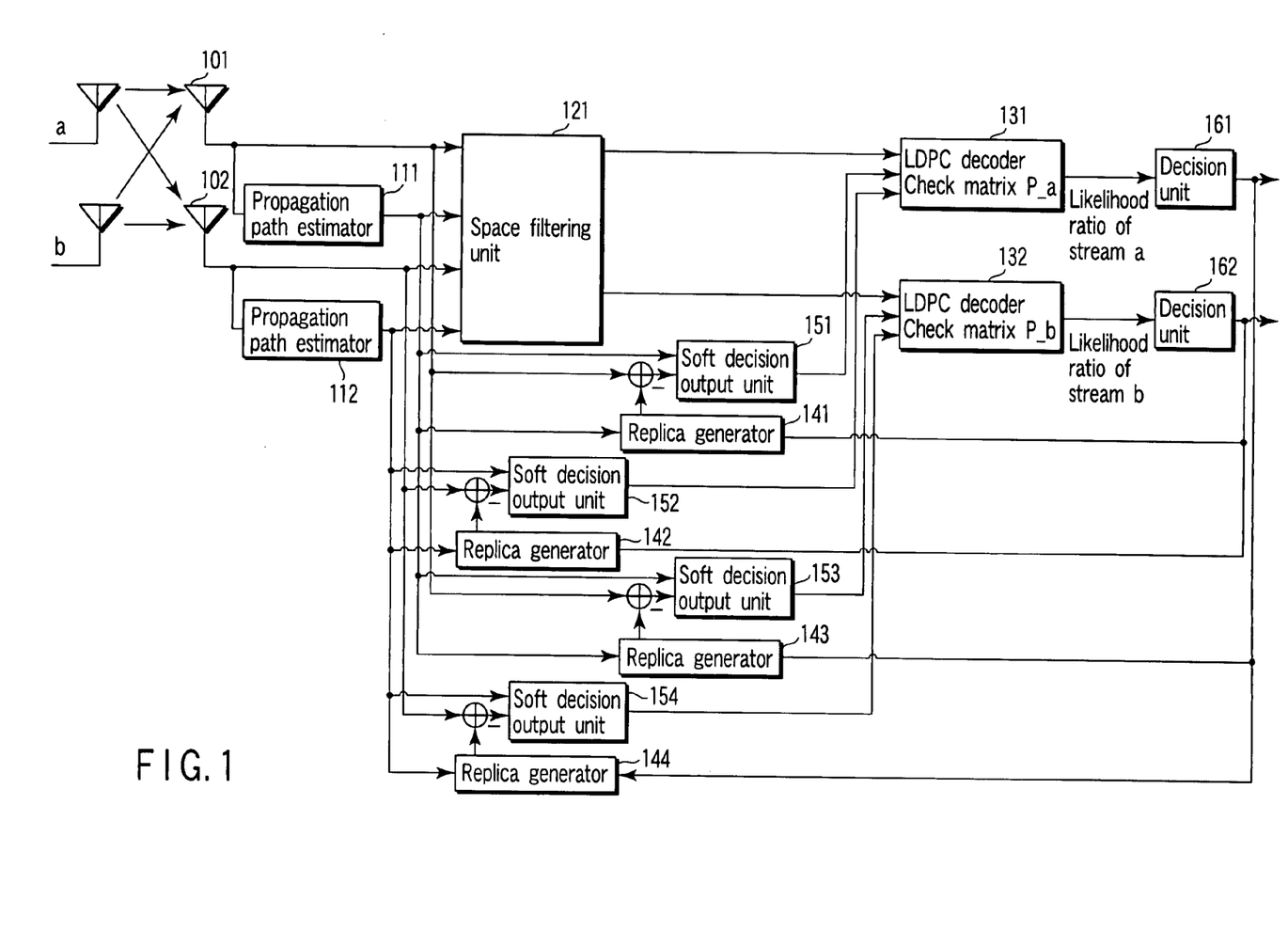
FIG. 1 is a block diagram showing a configuration of a MIMO receiving apparatus according to the first embodiment of the present invention.

FIG. 1 is a block diagram showing a configuration of a MIMO receiving apparatus according to the first embodiment of the present invention. Each of the blocks is explained in detail with reference to FIG. 1. Antennas 101, 102 receive signals arriving through different propagation paths. The signals received by the antennas 101, 102, respectively, are signals formed by subjecting two different transmit signals (streams a, b) to space multiplexing.

A propagation path estimator 111 estimates a propagation path of the signal received by the antenna 101 by using reference signals included in the received signal and forms a propagation path matrix H. A propagation path estimator 112 estimates a propagation path of the signal received by the antenna 102 by using reference signals included in the received signal and forms a propagation path matrix H. The propagation path matrix H is a matrix defined with the number of rows of the number of receiving antennas and the number of columns of the number of transmitting antennas, and is composed of propagation path response vectors proceeding from the transmitting antennas to the receiving antennas.

A space filtering unit 121 separate the receive signals received by the antennas 101, 102 to transmit signals to be subjected to space multiplexing, by using the propagation path matrices H formed by the respective propagation path estimators 111, 112.

LDPC decoders 131, 132 comprise check matrices (hereinafter called modified check matrices) P_a, P_b modified in different forms by fundamental row operation. The LDPC decoders 131, 132 subject the separated signals obtained by the space filtering unit 121 to LDPC decoding by using the modified check matrices P_a, P_b to obtain likelihood ratios of the respective streams a, b.

To obtain the likelihood ratios, the LDPC decoders 131, 132 first execute provisional decision and then execute actual decision. In the provisional decision, the LDPC decoders 131, 132 subject the separated signals obtained by the space filtering unit 121 to LDPC decoding by using the modified check matrices P_a, P_b and obtain the likelihood ratios of the respective streams a, b.

After that, in the actual decision, the LDPC decoder 131 subjects receive likelihood values obtained by soft decision output units 151, 152 to be explained later to LDPC decoding by using the modified check matrix P_a and obtains the likelihood ratio of the stream a.

Similarly, in the actual decision, the LDPC decoder 132 subjects receive likelihood values obtained by soft decision output units 153, 154 to be explained later to LDPC decoding by using the modified check matrix P_b and obtains the likelihood ratio of the stream b. The likelihood values obtained by the LDPC decoders 131, 132 are soft values such as 0.3 or 0.7.

A decision unit 161 subjects the likelihood ratio obtained by the LDPC decoder 131 to binary decision and obtains decoded sequence included in the stream a. More specifically, in a case of a logarithmic likelihood ratio by which a likelihood ratio is represented with logarithm, the decision unit 161 decides 1 if the likelihood ratio is a positive value and decides 0 if the likelihood ratio is a negative value. Similarly, a decision unit 162 subjects the likelihood ratio obtained by the LDPC decoder 132 to binary decision and obtains decoded sequence included in the stream b. The decoded sequences obtained by the decision units 161 and 162 are hard values such as 0 or 1.

A replica generator 141 generates a replica signal b1 of the stream b received by the antenna 101, on the basis of the propagation path information estimated by the propagation path estimator 111 and the decoded sequence of the stream b obtained by the decision unit 162.

A replica generator 142 generates a replica signal b2 of the stream b received by the antenna 102, on the basis of the propagation path information estimated by the propagation path estimator 112 and the decoded sequence of the stream b obtained by the decision unit 162.

A replica generator 143 generates a replica signal a1 of the stream a received by the antenna 101, on the basis of the propagation path information estimated by the propagation path estimator 111 and the decoded sequence of the stream a obtained by the decision unit 161.

A replica generator 144 generates a replica signal a2 of the stream a received by the antenna 102, on the basis of the propagation path information estimated by the propagation path estimator 112 and the decoded sequence of the stream a obtained by the decision unit 161.

The soft decision output unit 151 acquires residual signal Rb1 by subtracting the replica signal b1 from the signal received by the antenna 101, and obtains a receive likelihood value on the basis of the residual signal Rb1 and the propagation path matrix H obtained by the propagation path estimator 111.

The soft decision output unit 152 acquires residual signal Rb2 by subtracting the replica signal b2 from the signal received by the antenna 102, and obtains a receive likelihood value on the basis of the residual signal Rb2 and the propagation path matrix H obtained by the propagation path estimator 112.

The soft decision output unit 153 acquires residual signal Ra1 by subtracting the replica signal a1 from the signal received by the antenna 101, and obtains a receive likelihood value on the basis of the residual signal Ra1 and the propagation path matrix H obtained by the propagation path estimator 111.

The soft decision output unit 154 acquires residual signal Ra2 by subtracting the replica signal a2 from the signal received by the antenna 102, and obtains a receive likelihood value on the basis of the residual signal Ra2 and the propagation path matrix H obtained by the propagation path estimator 112.

Next, operations of the MIMO receiving apparatus having the above-explained configuration will be described.

The signals received by the antennas 101, 102 are input to the respectively corresponding propagation path estimators 111, 112 and the propagation path matrices H are estimated by using the reference signals included in the receive signals, in the propagation path estimators 111, 112.

The propagation path matrices H are used to separate the streams a, b from the receive signals received by the antennas 101, 102, in the space filtering unit 121. As the MIMO separation algorithm, Zero Forcing (ZF), Minimum Mean Square Error (MMSE), or the like is employed.

The streams a, b separated in the space filtering unit 121 are subjected to LDPC decoding using the modified basic matrices P_a, P_b, respectively, by the provisional decision of the LDPC decoders 131, 132.

The likelihood ratios of the streams a, b are derived by the LDPC decoding based on the provisional decision. The likelihood ratios of the streams a, b obtained in the LDPC decoders 131, 132 are used for provisional decision of the decoded sequences of the respective streams a, b, in the decision units 161, 162.

Subsequently, to generate the number equivalent to the number of transmission streams×number of receiving antennas, of the replica signals, four replica generators 141 to 144 are used in the present embodiment. The replica signal b1 of the stream b received by the antenna 101, the replica signal b2 of the stream b received by the antenna 102, the replica signal a1 of the stream a received by the antenna 101, and the replica signal a2 of the stream a received by the antenna 102, are obtained.

Next, the replica signals a1, a2, b1, b2 are removed from the receive signals received by the antennas 101, 102 to obtain the residual signals Ra1, Ra2, Rb1, Rb2. On the basis of the residual signals Ra1, Ra2, Rb1, Rb2 and the propagation path matrices H obtained by the propagation path estimators 111, 112, the receive likelihood values are obtained by the soft decision output units 151, 152, 153, 154.

When the receive likelihood values are thus obtained, the LDPC decoders 131, 132 execute the actual decision. In other words, in the LDPC decoder 131, the receive likelihood values obtained by the soft decision output units 151, 152 are subjected to LDPC decoding using the modified check matrix P_a to obtain the likelihood ratio of the stream a. In the LDPC decoder 132, the receive likelihood values obtained by the soft decision output units 153, 154 are subjected to LDPC decoding using the modified check matrix P_b to obtain the likelihood ratio of the stream b.

The likelihood ratio of the stream a obtained by the actual decision of the LDPC decoder 131 is subjected to binary decision by the decision unit 161 and the decoded sequence included in the stream a is thereby obtained. More specifically, in a case where the likelihood ratio is a logarithmic likelihood ratio defined by logarithm, the decision unit 161 decides 1 when the likelihood ratio is a positive value while the decision unit 161 decides 0 when the likelihood ratio is a negative value. Similarly, the likelihood ratio of the stream b obtained by the actual decision of the LDPC decoder 132 is subjected to binary decision by the decision unit 162 and the decoded sequence included in the stream b is thereby obtained.

The LDPC decoders 131, 132 check the parities of the streams corresponding respectively to the LDPC decoders and discriminate whether or not there is no error in the parities. If there is no parity error, the LDPC decoders 131, 132 notify the decision units 161, 162 of no parity error and urge data processors of the subsequent stage to output the decoded sequences.

Thus, diversity gain can be acquired and demodulation performance can be improved by subjecting the residual signals obtained by removing the replica signals from the receive signals of multiplexed streams a, b, to LDPC decoding, rather than separating and demodulating the signals by spatial filtering of the space filtering unit 121.

In the MIMO receiving apparatus having the above-described configuration, the LDPC decoders 131, 132 first execute the provisional decision at the initial stage of decoding, and the replica generators 141 to 144 generate the replica signals by using a provisional decision result of the receive signals thus obtained. The soft decision output units 151 to 154 acquire the receive likelihood values by using the receive signals and the residual signals obtained by removing the replica signals from the receive signals. After that, the LDPC decoders 131, 132 execute the actual decision, obtain the likelihood ratios of the streams a, b by subjecting the receive likelihood values to LDPC decoding, and acquire the decoded sequences of the streams a, b, by subjecting the likelihood ratios to binary decision in the decision units 161, 162.

Therefore, according to the MIMO receiving apparatus, preferable receiving performance can be obtained since the replica signals based on the decoding result obtained by the provisional decision are fed back to the soft decision output units 151 to 154 and the actual decision is executed.

The feedback to generate the replica signals may be iterated at an arbitrary number of times. By checking the parity portion of LDPC codes, it can be discriminated whether or not an error is included in the decoding result. For this reason, the LDPC decoders 131, 132 may check the parity in each of the streams and iterate the feedback until the decoding result includes no error.

In this case, the LDPC decoders 131, 132 check the parity in each of the streams and discriminate whether or not the decoding result includes no error. If the decoding result includes an error, the LDPC decoders 131, 132 control the decision units 161, 162 to feed back their outputs and generate the replica signals. If the decoding result includes no error, the LDPC decoders 131, 132 implement the feedback by transmitting the outputs of the decision units 161, 162 to a data processor of a subsequent stage.

In addition, in the MIMO receiving apparatus, spatial correlation between the stream a and the stream b can be reduced since the LDPC decoding of the LDPC decoders 131, 132 employs different check matrices obtained by processing check matrices in fundamental row operation. For this reason, even if the propagation paths have correlation and the performance are not improved by iterating the conventional feedback, preferable error performance can be obtained. The modified check matrices P_a, P_b employed at the decoding of the LDPC decoders 131, 132 may be exchanged with each other as P_b, P_a or replaced with different modified check matrices P_c, P_d every time the feedback is iterated.

Figure 2:
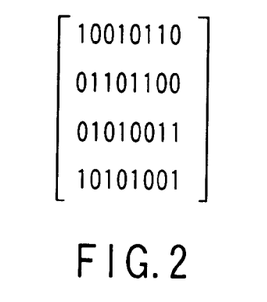
FIG. 2 is a check matrix used in LDPC decoder of the MIMO receiving apparatus shown in FIG. 1.
Figure 3:
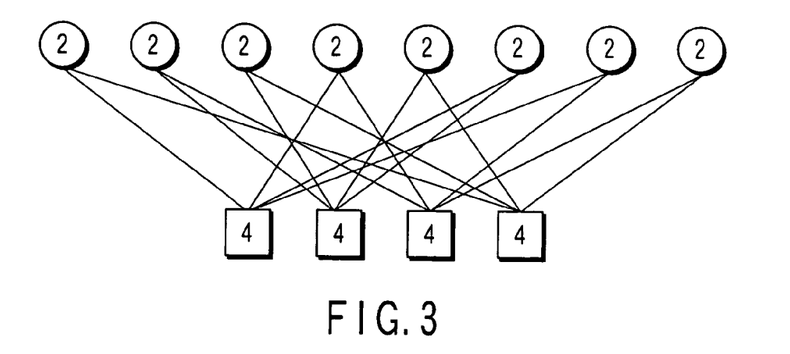
FIG. 3 is a bipartite graph corresponding to the check matrix shown in FIG. 2.

The LDPC check matrix processed by fundamental row operation is explained here. FIG. 2 shows a check matrix employed with the LDPC codes and FIG. 3 shows a bipartite graph corresponding to the check matrix. Row vectors of the check matrix shown in FIG. 2 correspond to variable nodes (upper-side nodes) of the bipartite graph while column vectors thereof correspond to check nodes (lower-side nodes). In the LDPC codes, the configuration of the bipartite graph gives a great influence to the decoding characteristics.

Figure 4:
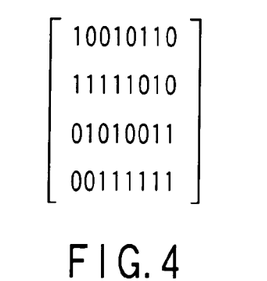
FIG. 4 is a modified check matrix obtained by subjecting the check matrix shown in FIG. 2 to fundamental row operation.
Figure 5:
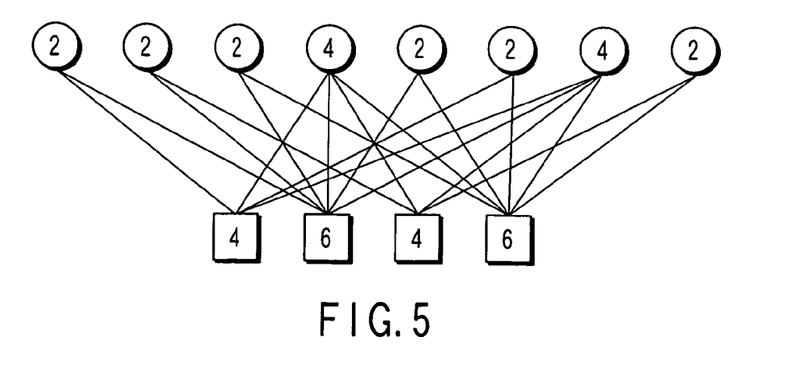
FIG. 5 is a bipartite graph corresponding to the check matrix shown in FIG. 4.

Processing the row vectors of the check matrix shown in FIG. 2 is considered. FIG. 4 shows a configuration of a check matrix in a case where the first row is added to the second and fourth rows in the check matrix shown in FIG. 2. FIG. 5 is a bipartite graph corresponding to the check matrix shown in FIG. 4.

Although the bipartite graph shown in FIG. 3 and the bipartite graph shown in FIG. 5 are different in configuration, determinants of the check matrices are equal. In this case, encoded sequences which are encoded by a generator matrix obtained from the check matrix shown in FIG. 2 can be decoded by the check matrix shown in FIG. 2 or the check matrix shown in FIG. 4.

However, the encoded sequences decoded by the check matrices are different in error rate characteristics. This difference results from variation of bits which exchange the likelihood information used at the decoding. In the first embodiment, using the characteristics, spatial correlation between the streams can be reduced by using different check matrices processed in fundamental row operation for the respective streams.

Figure 6:
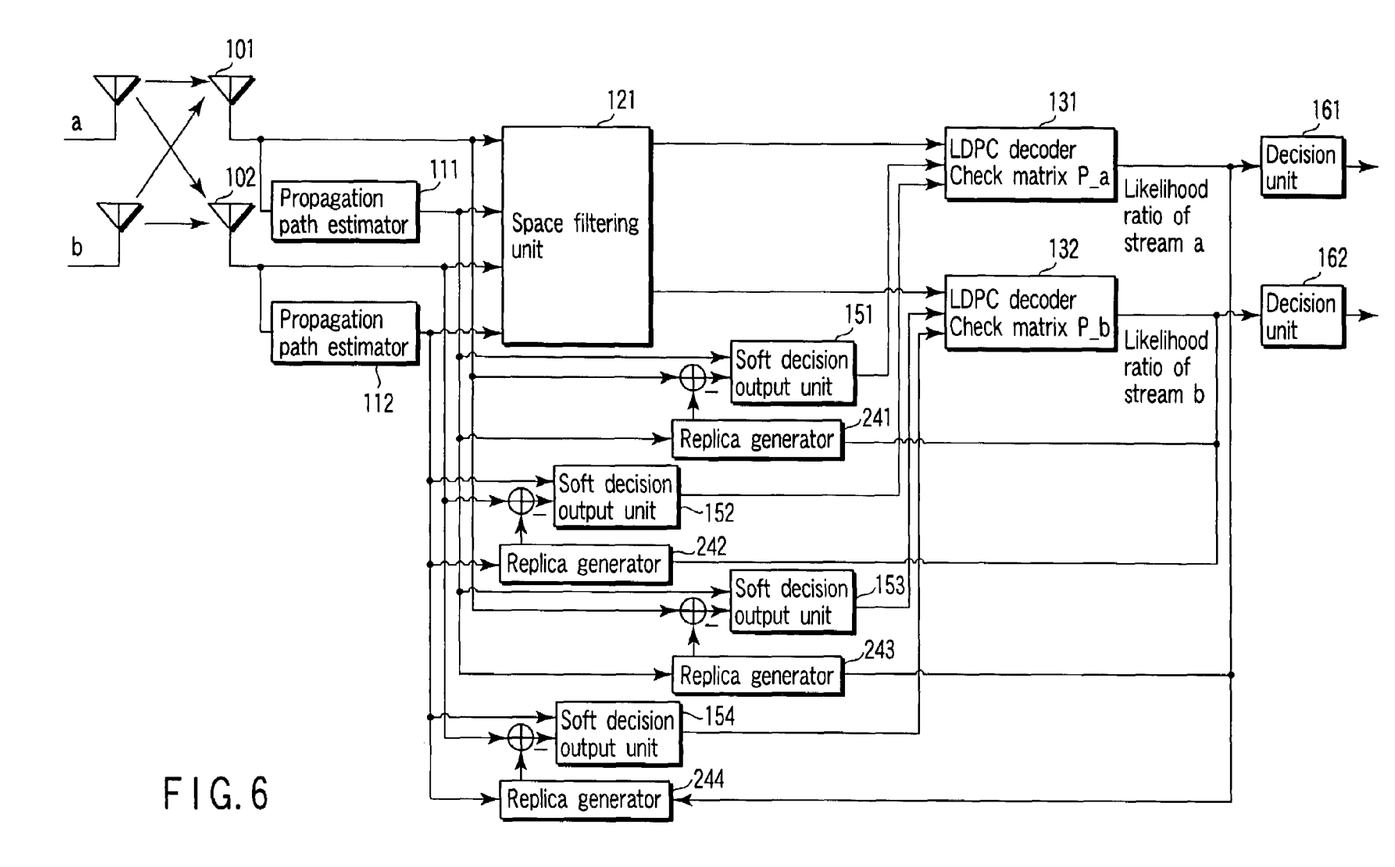
FIG. 6 is a block diagram showing a configuration of a MIMO receiving apparatus according to the second embodiment of the present invention.

Next, a MIMO receiving apparatus according to the second embodiment of the present invention will be described. FIG. 6 is a block diagram showing a configuration of the MIMO receiving apparatus. Each block of the configuration is explained with reference to FIG. 6. Antennas 101, 102 receive signals arriving through different propagation paths. The signals received by the antennas 101, 102, respectively, are signals formed by subjecting two different transmit signals (streams a, b) to space multiplexing.

A propagation path estimator 111 estimates a propagation path of the signal received by the antenna 101 by using reference signals included in the received signal and forms a propagation path matrix H. A propagation path estimator 112 estimates a propagation path of the signal received by the antenna 102 by using reference signals included in the received signal and forms a propagation path matrix H. The propagation path matrix H is a matrix defined with the number of rows of the number of receiving antennas and the number of columns of the number of transmitting antennas, and is composed of propagation path response vectors proceeding from the transmitting antennas to the receiving antennas.

A space filtering unit 121 separate the receive signals received by the antennas 101, 102 to transmit signals to be subjected to space multiplexing, by using the propagation path matrices H formed by the respective propagation path estimators 111, 112.

LDPC decoders 131, 132 comprise check matrices (hereinafter called modified check matrices) P_a, P_b modified in different forms by fundamental row operation. The LDPC decoders 131, 132 subject the separated signals obtained by the space filtering unit 121 to LDPC decoding by using the modified check matrices P_a, P_b to obtain likelihood ratios of the respective streams a, b.

To obtain the likelihood ratios, the LDPC decoders 131, 132 first execute provisional decision and then execute actual decision. In the provisional decision, the LDPC decoders 131, 132 subject the separated signals obtained by the space filtering unit 121 to LDPC decoding by using the modified check matrices P_a, P_b and obtain the likelihood ratios of the respective streams a, b.

After that, in the actual decision, the LDPC decoder 131 subjects receive likelihood values obtained by soft decision output units 151, 152 to be explained later to LDPC decoding by using the modified check matrix P_a and obtains the likelihood ratio of the stream a.

Similarly, in the actual decision, the LDPC decoder 132 subjects receive likelihood values obtained by soft decision output units 153, 154 to be explained later to LDPC decoding by using the modified check matrix P_b and obtains the likelihood ratio of the stream b. The likelihood values obtained by the LDPC decoders 131, 132 are soft values such as 0.3 or 0.7.

A decision unit 161 subjects the likelihood ratio obtained by the LDPC decoder 131 to binary decision and obtains decoded sequence included in the stream a. More specifically, in a case of a logarithmic likelihood ratio by which a likelihood ratio is represented with logarithm, the decision unit 161 decides 1 if the likelihood ratio is a positive value and decides 0 if the likelihood ratio is a negative value. Similarly, a decision unit 162 subjects the likelihood ratio obtained by the LDPC decoder 132 to binary decision and obtains decoded sequence included in the stream b. The decoded sequences obtained by the decision units 161 and 162 are hard values such as 0 or 1.

A soft replica generator 241 generates a soft replica signal Sb1 of the stream b received by the antenna 101, on the basis of the propagation path information estimated by the propagation path estimator 111 and the likelihood ratio of the stream b obtained by the LDPC decoder 132.

A soft replica generator 242 generates a soft replica signal Sb2 of the stream b received by the antenna 102, on the basis of the propagation path information estimated by the propagation path estimator 112 and the likelihood ratio of the stream b obtained by the LDPC decoder 132.

A soft replica generator 243 generates a soft replica signal Sa1 of the stream a received by the antenna 101, on the basis of the propagation path information estimated by the propagation path estimator 111 and the likelihood ratio of the stream a obtained by the LDPC decoder 131.

A soft replica generator 244 generates a soft replica signal Sa2 of the stream a received by the antenna 102, on the basis of the propagation path information estimated by the propagation path estimator 112 and the likelihood ratio of the stream a obtained by the LDPC decoder 131.

The soft decision output unit 151 acquires residual signal Rb1 by subtracting the soft replica signal Sb1 from the signal received by the antenna 101, and obtains a receive likelihood value on the basis of the residual signal Rb1 and the propagation path matrix H obtained by the propagation path estimator 111.

The soft decision output unit 152 acquires residual signal Rb2 by subtracting the soft replica signal Sb2 from the signal received by the antenna 102, and obtains a receive likelihood value on the basis of the residual signal Rb2 and the propagation path matrix H obtained by the propagation path estimator 112.

The soft decision output unit 153 acquires residual signal Ra1 by subtracting the soft replica signal Sa1 from the signal received by the antenna 101, and obtains a receive likelihood value on the basis of the residual signal Ra1 and the propagation path matrix H obtained by the propagation path estimator 111.

The soft decision output unit 154 acquires residual signal Ra2 by subtracting the soft replica signal Sa2 from the signal received by the antenna 102, and obtains a receive likelihood value on the basis of the residual signal Ra2 and the propagation path matrix H obtained by the propagation path estimator 112.

Next, operations of the MIMO receiving apparatus having the above-explained configuration will be described.

The signals received by the antennas 101, 102 are input to the propagation path estimators 111, 112 corresponding respectively to the antennas and the propagation path matrices H are estimated by using the reference signals included in the receive signals, in the propagation path estimators 111, 112.

The propagation path matrices H are used to separate the streams a, b from the receive signals received by the antennas 101, 102, in the space filtering unit 121. As the MIMO separation algorithm, ZF, MMSE or the like is employed.

The streams a, b separated in the space filtering unit 121 are subjected to LDPC decoding using the modified basic matrices P_a, P_b, respectively, by the provisional decision of the LDPC decoders 131, 132.

The likelihood ratios of the streams a, b are derived by the LDPC decoding based on the provisional decision. The likelihood ratios of the streams a, b obtained in the LDPC decoders 131, 132 are used for generation of the soft replica signals Sa1, Sa2, Sb1, Sb2 in decoded sequences of the respective streams a, b, in the soft replica generators 241 to 244.

To generate the number equivalent to the number of transmission streams×number of receiving antennas, of the soft replica signals, four soft replica generators 241 to 244 are used in the present embodiment. The soft replica signal Sb1 of the stream b received by the antenna 101, the soft replica signal Sb2 of the stream b received by the antenna 102, the soft replica signal Sa1 of the stream a received by the antenna 101, and the soft replica signal Sa2 of the stream a received by the antenna 102, are obtained.

Next, the soft replica signals Sa1, Sa2, Sb1, Sb2 are removed from the receive signals received by the antennas 101, 102 to obtain the residual signals Ra1, Ra2, Rb1, Rb2. On the basis of the residual signals Ra1, Ra2, Rb1, Rb2 and the propagation path matrices H obtained by the propagation path estimators 111, 112, the receive likelihood values are obtained by the soft decision output units 151, 152, 153, 154.

When the receive likelihood values are thus obtained, the LDPC decoders 131, 132 execute the actual decision. In other words, in the LDPC decoder 131, the receive likelihood values obtained by the soft decision output units 151, 152 are subjected to LDPC decoding using the modified check matrix P_a to obtain the likelihood ratio of the stream a. In the LDPC decoder 132, the receive likelihood values obtained by the soft decision output units 153, 154 are subjected to LDPC decoding using the modified check matrix P_b to obtain the likelihood ratio of the stream b.

The likelihood ratio of the stream a obtained by the actual decision of the LDPC decoder 131 is subjected to binary decision by the decision unit 161 and the decoded sequence included in the stream a is thereby obtained. Similarly, the likelihood ratio of the stream b obtained by the actual decision of the LDPC decoder 132 is subjected to binary decision by the decision unit 162 and the decoded sequence included in the stream b is thereby obtained. More specifically, in a case where the likelihood ratio is a logarithmic likelihood ratio defined by logarithm, the decision unit 161 decides 1 when the likelihood ratio is a positive value while the decision unit 161 decides 0 when the likelihood ratio is a negative value.

The LDPC decoders 131, 132 check the parities of the streams corresponding respectively to the LDPC decoders and discriminate whether or not there is no error in the parities. If there is no parity error, the LDPC decoders 131, 132 notify the decision units 161, 162 of no parity error and urge data processors of the subsequent stage to output the decoded sequences.

Thus, diversity gain can be acquired and demodulation performance can be improved by subjecting the residual signals obtained by removing the replica signals from the receive signals of multiplexed streams a, b, to LDPC decoding, rather than separating and demodulating the signals by spatial filtering of the space filtering unit 121.

In the MIMO receiving apparatus having the above-described configuration, the LDPC decoders 131, 132 first execute the provisional decision at the initial stage of decoding, and the soft replica generators 241 to 244 generate the soft replica signals by using a provisional decision result of the receive signals thus obtained. The soft decision output units 151 to 154 acquire the receive likelihood values by using the receive signals and the residual signals obtained by removing the soft replica signals from the receive signals. After that, the LDPC decoders 131, 132 execute the actual decision, obtain the likelihood ratios of the streams a, b by subjecting the receive likelihood values to LDPC decoding, and acquire the decoded sequences of the streams a, b, by subjecting the likelihood ratios to binary decision in the decision units 161, 162.

Therefore, according to the MIMO receiving apparatus, preferable receiving performance can be obtained since the soft replica signals based on the decoding result obtained by the provisional decision are fed back to the soft decision output units 151 to 154 and the actual decision is executed.

Furthermore, occurrence of interference caused by a decision error can be prevented by using the soft replica signals based on the soft values obtained from the likelihood ratios, and more desirable performance than the MIMO receiving apparatus of the first embodiment can be obtained.

The feedback may be iterated at an arbitrary number of times after the provisional decision, in the present embodiment. By checking the parity portion of LDPC codes, it can be discriminated whether or not an error is included in the decoding result. For this reason, the feedback may be iterated until the decoding result includes no error, by checking the parities in all of the streams. The iteration of the feedback can be implemented by providing parity check means for checking the parities in all of the streams, decision means for discriminating whether or not there is no error in the decoding result and control means for controlling each of the units in the MIMO receiving apparatus to iterate the feedback.

In addition, spatial correlation between the stream a and the stream b can be reduced since the LDPC decoding of the LDPC decoders 131, 132 employs different check matrices obtained by processing check matrices in fundamental row operation. For this reason, even if the propagation paths have correlation and the performance are not improved by iterating the conventional feedback, preferable error performance can be obtained. The modified check matrices P_a, P_b employed at the decoding of the LDPC decoders 131, 132 may be exchanged with each other as P_b, P_a or replaced with different modified check matrices P_c, P_d every time the feedback is iterated.

Figure 7:
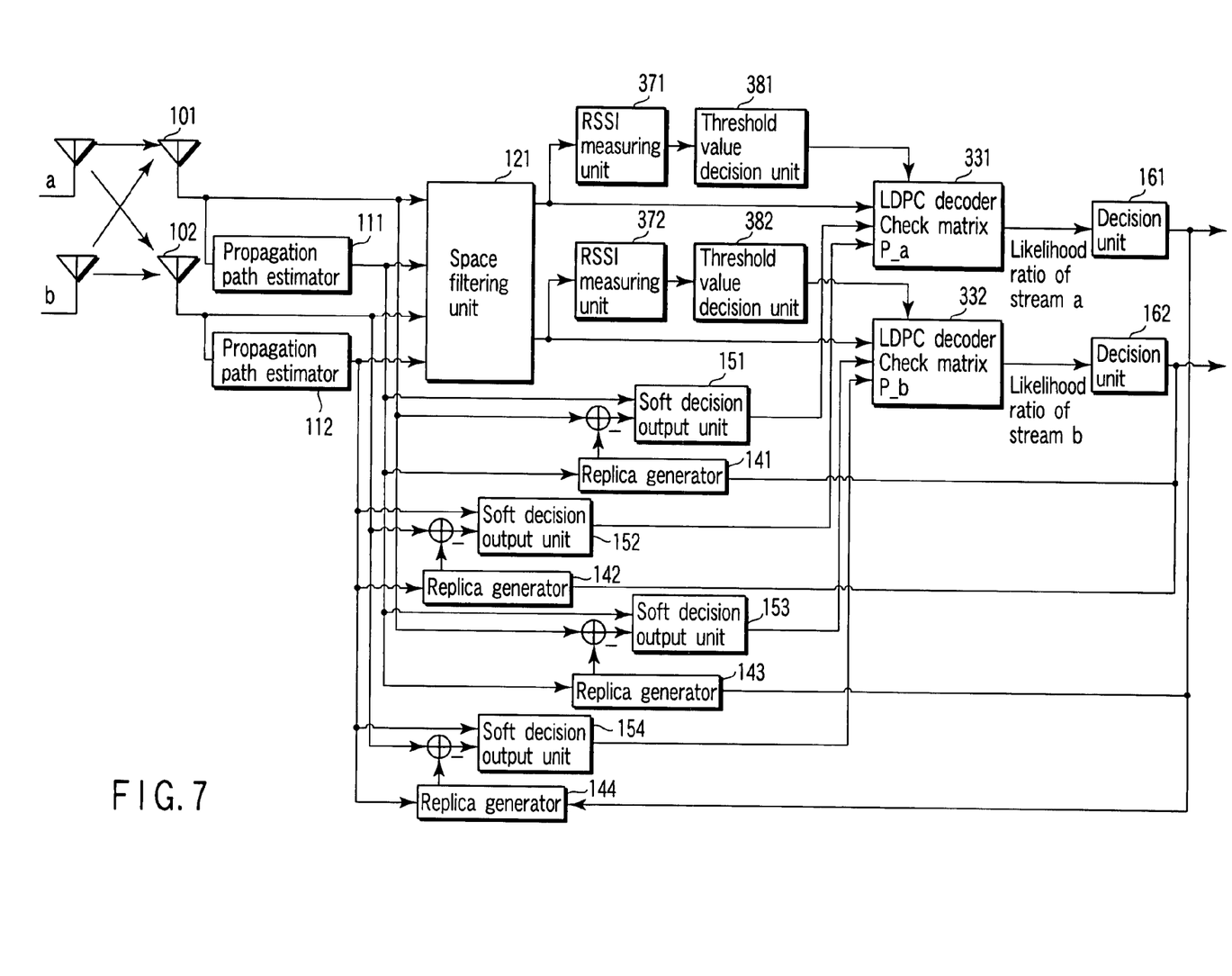
FIG. 7 is a block diagram showing a configuration of a MIMO receiving apparatus according to the third embodiment of the present invention.

Next, a MIMO receiving apparatus according to the third embodiment of the present invention will be described. FIG. 7 is a block diagram showing a configuration of the MIMO receiving apparatus. Each of the blocks is explained in detail with reference to FIG. 7. Antennas 101, 102 receive signals arriving through different propagation paths. The signals received by the antennas 101, 102, respectively, are signals formed by subjecting two different transmit signals (streams a, b) to space multiplexing.

A propagation path estimator 111 estimates a propagation path of the signal received by the antenna 101 by using reference signals included in the received signal and forms a propagation path matrix H. A propagation path estimator 112 estimates a propagation path of the signal received by the antenna 102 by using reference signals included in the received signal and forms a propagation path matrix H. The propagation path matrix H is a matrix defined with the number of rows of the number of receiving antennas and the number of columns of the number of transmitting antennas, and is composed of propagation path response vectors proceeding from the transmitting antennas to the receiving antennas.

A space filtering unit 121 separate the receive signals received by the antennas 101, 102 to transmit signals to be subjected to space multiplexing, by using the propagation path matrices H formed by the respective propagation path estimators 111, 112.

An RSSI measuring unit 371 measures a Received Signal Strength Indicator (RSSI) of one of the separated signals obtained by the space filtering unit 121. An RSSI measuring unit 372 measures the RSSI of the other separated signals obtained by the space filtering unit 121.

A threshold value decision unit 381 compares the RSSI value measured by the RSSI measuring unit 371 with a preset threshold value, and determines the number of times in iteration C1 of the LDPC decoding executed in a LDPC decoder 331 of a subsequent stage in accordance with the RSSI value. More specifically, the number of times in iteration C1 is reduced as the RSSI value is greater while the number of times in iteration C1 is increased as the RSSI value is smaller.

A threshold value decision unit 382 compares the RSSI value measured by the RSSI measuring unit 372 with a preset threshold value, and determines the number of times in iteration C2 of the LDPC decoding executed in a LDPC decoder 332 of a subsequent stage in accordance with the RSSI value. More specifically, the number of times in iteration C2 is reduced as the RSSI value is greater while the number of times in iteration C2 is increased as the RSSI value is smaller.

LDPC decoders 331, 332 comprise check matrices (hereinafter called modified check matrices) P_a, P_b modified in different forms by fundamental row operation. The LDPC decoders 331, 332 subject the separated signals obtained by the space filtering unit 121 to LDPC decoding by using the modified check matrices P_a, P_b to obtain likelihood ratios of the respective streams a, b.

To obtain the likelihood ratios, the LDPC decoders 331, 332 first execute provisional decision and then execute actual decision. In the provisional decision, the LDPC decoders 331, 332 iterate the LDPC decoding using the modified check matrices P_a, P_b corresponding respectively to the LDPC decoders, at the number of times in iteration C1, for the separated signals obtained by the space filtering unit 121 and obtain the likelihood ratios of the respective streams a, b.

After that, in the actual decision, the LDPC decoder 331 iterates the LDPC decoding using the modified check matrix P_a, at the number of times in iteration C1, for receive likelihood values obtained by soft decision output units 151, 152 to be explained later and obtains the likelihood ratio of the stream a.

Similarly, in the actual decision, the LDPC decoder 332 iterates the LDPC decoding using the modified check matrix P_b, at the number of times in iteration C2, for receive likelihood values obtained by soft decision output units 153, 154 to be explained later and obtains the likelihood ratio of the stream b. The likelihood ratios obtained by the LDPC decoders 331, 332 are soft values such as 0.3 or 0.7.

A decision unit 161 subjects the likelihood ratio obtained by the LDPC decoder 331 to binary decision and obtains decoded sequence included in the stream a. More specifically, in a case of a logarithmic likelihood ratio by which a likelihood ratio is represented with logarithm, the decision unit 161 decides 1 if the likelihood ratio is a positive value and decides 0 if the likelihood ratio is a negative value. Similarly, a decision unit 162 subjects the likelihood ratio obtained by the LDPC decoder 332 to binary decision and obtains decoded sequence included in the stream b. The decoded sequences obtained by the decision units 161 and 162 are hard values such as 0 or 1.

A replica generator 141 generates a replica signal b1 of the stream b received by the antenna 101, on the basis of the propagation path information estimated by the propagation path estimator 111 and the likelihood ratio of the stream b obtained by the decision unit 162.

A replica generator 142 generates a replica signal b2 of the stream b received by the antenna 102, on the basis of the propagation path information estimated by the propagation path estimator 112 and the likelihood ratio of the stream b obtained by the decision unit 162.

A replica generator 143 generates a replica signal a1 of the stream a received by the antenna 101, on the basis of the propagation path information estimated by the propagation path estimator 111 and the likelihood ratio of the stream a obtained by the decision unit 161.

A replica generator 144 generates a replica signal a2 of the stream a received by the antenna 102, on the basis of the propagation path information estimated by the propagation path estimator 112 and the likelihood ratio of the stream a obtained by the decision unit 161.

The soft decision output unit 151 acquires residual signal Rb1 by subtracting the replica signal b1 from the signal received by the antenna 101, and obtains a receive likelihood value on the basis of the residual signal Rb1 and the propagation path matrix H obtained by the propagation path estimator 111.

The soft decision output unit 152 acquires residual signal Rb2 by subtracting the replica signal b2 from the signal received by the antenna 102, and obtains a receive likelihood value on the basis of the residual signal Rb2 and the propagation path matrix H obtained by the propagation path estimator 112.

The soft decision output unit 153 acquires residual signal Ra1 by subtracting the replica signal a1 from the signal received by the antenna 101, and obtains a receive likelihood value on the basis of the residual signal Ra1 and the propagation path matrix H obtained by the propagation path estimator 111.

The soft decision output unit 154 acquires residual signal Ra2 by subtracting the replica signal a2 from the signal received by the antenna 102, and obtains a receive likelihood value on the basis of the residual signal Ra2 and the propagation path matrix H obtained by the propagation path estimator 112.

Next, operations of the MIMO receiving apparatus having the above-explained configuration will be described.

The signals received by the antennas 101, 102 are input to the propagation path estimators 111, 112 corresponding respectively to the antennas and the propagation path matrices H are estimated by using the reference signals included in the receive signals, in the propagation path estimators 111, 112.

The propagation path matrices H thus estimated are used to separate the streams a, b from the receive signals received by the antennas 101, 102, in the space filtering unit 121. As the MIMO separation algorithm, ZF, MMSE or the like is employed.

The RSSI values of the streams a, b separated in the space filtering unit 121 are measured by the RSSI measuring units 371, 372, respectively. On the basis of the measurement results, the number of times in iteration C1 and the number of times in iteration C2 are determined by the threshold value decision units 381, 382.

The provisional decision is executed by the LDPC decoders 331, 332 and the streams a, b separated in the space filtering unit 121 are subjected to LDPC decoding using the modified basic matrices P_a, P_b, respectively.

The likelihood ratios of the streams a, b are derived by the LDPC decoding based on the provisional decision. The likelihood ratios of the streams a, b obtained in the LDPC decoders 331, 332 are used for provisional decision of the decoded sequences of the respective streams a, b, in the decision units 161, 162.

Subsequently, to generate the number equivalent to the number of transmission streams×number of receiving antennas, of the replica signals, four replica generators 141 to 144 are used in the present embodiment. The replica signal b1 of the stream b received by the antenna 101, the replica signal b2 of the stream b received by the antenna 102, the replica signal a1 of the stream a received by the antenna 101, and the replica signal a2 of the stream a received by the antenna 102, are obtained.

Next, the replica signals a1, a2, b1, b2 are removed from the receive signals received by the antennas 101, 102 to obtain the residual signals Ra1, Ra2, Rb1, Rb2. On the basis of the residual signals Ra1, Ra2, Rb1, Rb2 and the propagation path matrices H obtained by the propagation path estimators 111, 112, the receive likelihood values are obtained by the soft decision output units 151, 152, 153, 154.

When the receive likelihood values are thus obtained, the LDPC decoder 331 iterates the actual decision at the number of times in iteration C1 and the LDPC decoder 332 iterates the actual decision at the number of times in iteration C2. In other words, in the LDPC decoder 331, LDPC decoding using the modified check matrix P_a is iterated at the number of times in iteration C1, for the receive likelihood values obtained by the soft decision output units 151, 152, to obtain the likelihood ratio of the stream a. In the LDPC decoder 332, LDPC decoding using the modified check matrix P_b is iterated at the number of times in iteration C2, for the receive likelihood values obtained by the soft decision output units 153, 154, to obtain the likelihood ratio of the stream b.

The likelihood ratio of the stream a obtained by the actual decision of the LDPC decoder 331 is subjected to binary decision by the decision unit 161 and the decoded sequence included in the stream a is thereby obtained. More specifically, in a case where the likelihood ratio is a logarithmic likelihood ratio defined by logarithm, the decision unit 161 decides 1 when the likelihood ratio is a positive value while the decision unit 161 decides 0 when the likelihood ratio is a negative value. Similarly, the likelihood ratio of the stream b obtained by the actual decision of the LDPC decoder 332 is subjected to binary decision by the decision unit 162 and the decoded sequence included in the stream b is thereby obtained.

The LDPC decoders 331, 332 check the parities of the streams corresponding respectively to the LDPC decoders and discriminate whether or not there is no error in the parities. If there is no parity error, the LDPC decoders 331, 332 notify the decision units 161, 162 of no parity error and urge data processors of the subsequent stage to output the decoded sequences.

Thus, diversity gain can be acquired and demodulation performance can be improved by subjecting the residual signals obtained by removing the replica signals from the receive signals of multiplexed streams a, b, to LDPC decoding, rather than separating and demodulating the signals by spatial filtering of the space filtering unit 121.

In the MIMO receiving apparatus having the above-described configuration, the LDPC decoders 331, 332 first execute the provisional decision at the initial stage of decoding, and the replica generators 141 to 144 generate the replica signals by using a provisional decision result of the receive signals thus obtained. The soft decision output units 151 to 154 acquire the receive likelihood values by using the receive signals and the residual signals obtained by removing the replica signals from the receive signals. After that, the LDPC decoders 331, 332 execute the actual decision, obtain the likelihood ratios of the streams a, b by iterating the LDPC decoding, at the number of times corresponding to the RSSI value, for the receive likelihood values, and acquire the decoded sequences of the streams a, b, by subjecting the likelihood ratios to binary decision in the decision units 161, 162.

Therefore, according to the MIMO receiving apparatus, preferable receiving performance can be obtained since the replica signals based on the decoding result obtained by the provisional decision are fed back to the soft decision output units 151 to 154 and the actual decision is executed.

The number of times in iteration of the LDPC decoding is varied in accordance with the RSSI value, i.e. Signal to Noise Ratio (SNR). The decoding result of constant quality can be therefore obtained irrespective of the SNR.

More specifically, if the RSSI of the stream is small, the decoding characteristic is improved by increasing the number of times in iteration of the LDPC decoding. If RSSI of the stream is great, the decoding is simplified by reducing the number of times in iteration of the LDPC decoding. Thus, efficient decoding can be implemented while keeping the receiving characteristic constant irrespective of the state of the SNR.

In addition, in the MIMO receiving apparatus, spatial correlation between the stream a and the stream b can be reduced since the LDPC decoding of the LDPC decoders 331, 332 employs different check matrices obtained by processing check matrices in fundamental row operation. For this reason, even if the propagation paths have correlation and the performance are not improved by iterating the conventional feedback, preferable error performance can be obtained. The modified check matrices P_a, P_b employed at the decoding of the LDPC decoders 331, 332 may be exchanged with each other as P_b, P_a or replaced with different modified check matrices P_c, P_d every time the feedback is iterated.

In the present embodiment, the replica signals are generated on the basis of the decision results of the decision units 161, 162. However, soft replica signals may be generated on the basis of the decoding results of the LDPC decoders 331, 332, similarly to the second embodiment.

Figure 8:
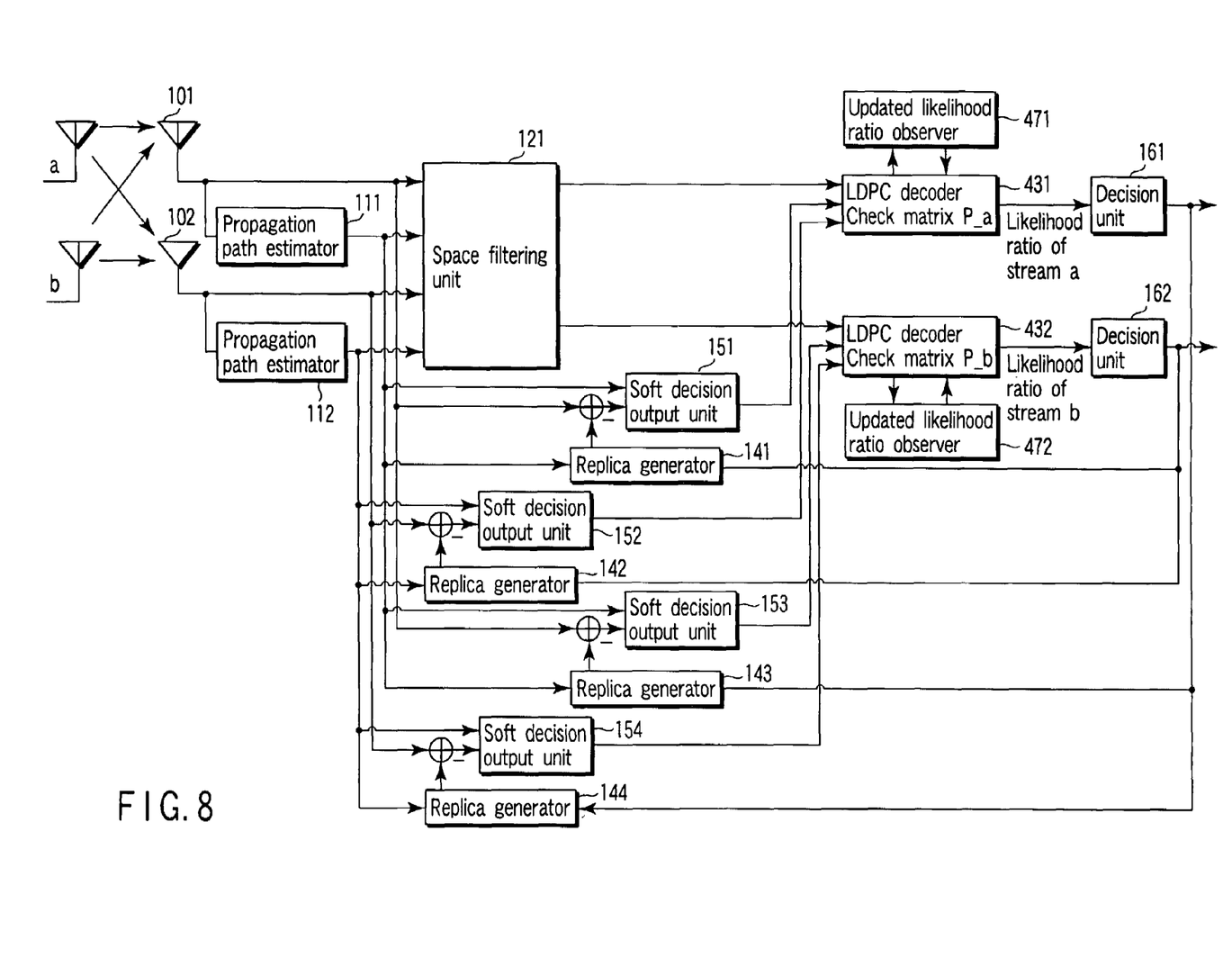
FIG. 8 is a block diagram showing a configuration of a MIMO receiving apparatus according to the fourth embodiment of the present invention.

Next, a MIMO receiving apparatus according to the fourth embodiment of the present invention will be described. FIG. 8 is a block diagram showing a configuration of the MIMO receiving apparatus. Each block of the configuration is explained with reference to FIG. 8. Antennas 101, 102 receive signals arriving through different propagation paths. The signals received by the antennas 101, 102, respectively, are signals formed by subjecting two different transmit signals (streams a, b) to space multiplexing.

A propagation path estimator 111 estimates a propagation path of the signal received by the antenna 101 by using reference signals included in the received signal and forms a propagation path matrix H. A propagation path estimator 112 estimates a propagation path of the signal received by the antenna 102 by using reference signals included in the received signal and forms a propagation path matrix H. The propagation path matrix H is a matrix defined with the number of rows of the number of receiving antennas and the number of columns of the number of transmitting antennas, and is composed of propagation path response vectors proceeding from the transmitting antennas to the receiving antennas.

A space filtering unit 121 separate the receive signals received by the antennas 101, 102 to transmit signals to be subjected to space multiplexing, by using the propagation path matrices H formed by the respective propagation path estimators 111, 112.

LDPC decoders 431, 432 comprise check matrices (hereinafter called modified check matrices) P_a, P_b modified in different forms by fundamental row operation. The LDPC decoders 431, 432 subject the separated signals obtained by the space filtering unit 121 to LDPC decoding by using the modified check matrices P_a, P_b to obtain likelihood ratios of the respective streams a, b.

To obtain the likelihood ratios, the LDPC decoders 431, 432 first execute provisional decision and then execute actual decision. In the provisional decision, the LDPC decoders 431, 432 subject the separated signals obtained by the space filtering unit 121 to LDPC decoding by using the modified check matrices P_a, P_b and obtain the likelihood ratios of the respective streams a, b.

After that, in the actual decision, the LDPC decoder 431 iterates LDPC decoding using the modified check matrix P_a, for receive likelihood values obtained by soft decision output units 151, 152 to be explained later, in accordance with an updated likelihood ratio observer 471 to be explained later, and obtains the likelihood ratio of the stream a.

Similarly, in the actual decision, the LDPC decoder 432 iterates LDPC decoding using the modified check matrix P_b, for receive likelihood values obtained by soft decision output units 153, 154 to be explained later, in accordance with an updated likelihood ratio observer 472 to be explained later, and obtains the likelihood ratio of the stream b. The likelihood values obtained by the LDPC decoders 431, 432 are soft values such as 0.3 or 0.7.

The updated likelihood ratio observer 471 compares the likelihood ratios obtained sequentially by iteration of the LDPC decoding of the LDPC decoder 431, and controls the LDPC decoding of the LDPC decoder 431 in accordance with the update amount of the likelihood ratios. More specifically, if the amount of the likelihood ratios updated by the decoding at one time is great, the updated likelihood ratio observer 471 urges the decoding to be continued. Since the error is greatly corrected, a great gain is obtained by the decoding. If the updated amount of the likelihood ratios is small, it can be determined that the gain is in a saturated state. Therefore, the decoding is stopped and the gain is obtained by removing the replica signals.

Similarly to the updated likelihood ratio observer 471, the updated likelihood ratio observer 472 compares the likelihood ratios obtained sequentially by iteration of the LDPC decoding of the LDPC decoder 432, and controls the LDPC decoding of the LDPC decoder 432 in accordance with the update amount of the likelihood ratios.

A decision unit 161 subjects the likelihood ratio obtained by the LDPC decoder 431 to binary decision and obtains decoded sequence included in the stream a. More specifically, in a case of a logarithmic likelihood ratio by which a likelihood ratio is represented with logarithm, the decision unit 161 decides 1 if the likelihood ratio is a positive value and decides 0 if the likelihood ratio is a negative value. Similarly, a decision unit 162 subjects the likelihood ratio obtained by the LDPC decoder 432 to binary decision and obtains decoded sequence included in the stream b. The decoded sequences obtained by the decision units 161 and 162 are hard values such as 0 or 1.

A replica generator 141 generates a replica signal b1 of the stream b received by the antenna 101, on the basis of the propagation path information estimated by the propagation path estimator 111 and the likelihood ratio of the stream b obtained by the decision unit 162.

A replica generator 142 generates a replica signal b2 of the stream b received by the antenna 102, on the basis of the propagation path information estimated by the propagation path estimator 112 and the likelihood ratio of the stream b obtained by the decision unit 162.

A replica generator 143 generates a replica signal a1 of the stream a received by the antenna 101, on the basis of the propagation path information estimated by the propagation path estimator 111 and the likelihood ratio of the stream a obtained by the decision unit 161.

A replica generator 144 generates a replica signal a2 of the stream a received by the antenna 102, on the basis of the propagation path information estimated by the propagation path estimator 112 and the likelihood ratio of the stream a obtained by the decision unit 161.

The soft decision output unit 151 acquires residual signal Rb1 by subtracting the replica signal b1 from the signal received by the antenna 101, and obtains a receive likelihood value on the basis of the residual signal Rb1 and the propagation path matrix H obtained by the propagation path estimator 111.

The soft decision output unit 152 acquires residual signal Rb2 by subtracting the replica signal b2 from the signal received by the antenna 102, and obtains a receive likelihood value on the basis of the residual signal Rb2 and the propagation path matrix H obtained by the propagation path estimator 112.

The soft decision output unit 153 acquires residual signal Ra1 by subtracting the replica signal a1 from the signal received by the antenna 101, and obtains a receive likelihood value on the basis of the residual signal Ra1 and the propagation path matrix H obtained by the propagation path estimator 111.

The soft decision output unit 154 acquires residual signal Ra2 by subtracting the replica signal a2 from the signal received by the antenna 102, and obtains a receive likelihood value on the basis of the residual signal Ra2 and the propagation path matrix H obtained by the propagation path estimator 112.

Next, operations of the MIMO receiving apparatus having the above-explained configuration will be described.

The signals received by the antennas 101, 102 are input to the propagation path estimators 111, 112 corresponding respectively to the antennas and the propagation path matrices H are estimated by using the reference signals included in the receive signals, in the propagation path estimators 111, 112.

The propagation path matrices H are used to separate the streams a, b from the receive signals received by the antennas 101, 102, in the space filtering unit 121. As the MIMO separation algorithm, ZF, MMSE or the like is employed.

The streams a, b separated in the space filtering unit 121 are subjected to LDPC decoding using the modified basic matrices P_a, P_b, respectively, by the provisional decision of the LDPC decoders 431, 432.

The likelihood ratios of the streams a, b are derived by the LDPC decoding based on the provisional decision. The likelihood ratios of the streams a, b obtained in the LDPC decoders 431, 432 are used for provisional decision of the decoded sequences of the respective streams a, b, in the decision units 161, 162.

Subsequently, to generate the number equivalent to the number of transmission streams×number of receiving antennas, of the replica signals, four replica generators 141 to 144 are used in the present embodiment. The replica signal b1 of the stream b received by the antenna 101, the replica signal b2 of the stream b received by the antenna 102, the replica signal a1 of the stream a received by the antenna 101, and the replica signal a2 of the stream a received by the antenna 102, are obtained.

Next, the replica signals a1, a2, b1, b2 are removed from the receive signals received by the antennas 101, 102 to obtain the residual signals Ra1, Ra2, Rb1, Rb2. On the basis of the residual signals Ra1, Ra2, Rb1, Rb2 and the propagation path matrices H obtained by the propagation path estimators 111, 112, the receive likelihood values are obtained by the soft decision output units 151, 152, 153, 154.

When the receive likelihood values are thus obtained, the LDPC decoders 431, 432 execute the actual decision. In other words, in the LDPC decoder 431, the receive likelihood values obtained by the soft decision output units 151, 152 are subjected to LDPC decoding using the modified check matrix P_a to obtain the likelihood ratio of the stream a. The LDPC decoding is iterated until the LDPC decoder 431 receives an instruction to stop the iteration of the LDPC decoding from the updated likelihood ratio observer 471.

Similarly to this, in the LDPC decoder 432, the receive likelihood values obtained by the soft decision output units 153, 154 are subjected to LDPC decoding using the modified check matrix P_b to obtain the likelihood ratio of the stream b. The LDPC decoding is iterated until the LDPC decoder 432 receives an instruction to stop the iteration of the LDPC decoding from the updated likelihood ratio observer 472.

The updated likelihood ratio observer 471 compares the likelihood ratios obtained sequentially by iteration of the LDPC decoding of the LDPC decoder 431. If the updated amount of the likelihood ratios is equal to or smaller than a threshold value, the updated likelihood ratio observer 471 gives an instruction to stop the LDPC decoding to the LDPC decoder 431.

Similarly to the updated likelihood ratio observer 471, the updated likelihood ratio observer 472 compares the likelihood ratios obtained sequentially by iteration of the LDPC decoding of the LDPC decoder 432. If the updated amount of the likelihood ratios is equal to or smaller than a threshold value, the updated likelihood ratio observer 472 gives an instruction to stop the LDPC decoding to the LDPC decoder 432.

The likelihood ratio of the stream a obtained by the actual decision of the LDPC decoder 431 is subjected to binary decision by the decision unit 161 and the decoded sequence included in the stream a is thereby obtained. More specifically, in a case where the likelihood ratio is a logarithmic likelihood ratio defined by logarithm, the decision unit 161 decides 1 when the likelihood ratio is a positive value while the decision unit 161 decides 0 when the likelihood ratio is a negative value. Similarly, the likelihood ratio of the stream b obtained by the actual decision of the LDPC decoder 432 is subjected to binary decision by the decision unit 162 and the decoded sequence included in the stream b is thereby obtained.

The LDPC decoders 431, 432 check the parities of the streams corresponding respectively to the LDPC decoders and discriminate whether or not there is no error in the parities. If there is no parity error, the LDPC decoders 431, 432 notify the decision units 161, 162 of no parity error and urge data processors of the subsequent stage to output the decoded sequences.

Thus, diversity gain can be acquired and demodulation performance can be improved by subjecting the residual signals obtained by removing the replica signals from the receive signals of multiplexed streams a, b, to LDPC decoding, rather than separating and demodulating the signals by spatial filtering of the space filtering unit 121.

In the MIMO receiving apparatus having the above-described configuration, the LDPC decoders 431, 432 first execute the provisional decision at the initial stage of decoding, and the replica generators 141 to 144 generate the replica signals by using a provisional decision result of the receive signals thus obtained. The soft decision output units 151 to 154 acquire the receive likelihood values by using the receive signals and the residual signals obtained by removing the replica signals from the receive signals. After that, the LDPC decoders 431, 432 execute the actual decision, obtain the likelihood ratios of the streams a, b by iterating the LDPC decoding for the receive likelihood values until the updated amount of the likelihood ratios obtained by the LDPC decoding becomes equal to or smaller than a threshold value, and acquire the decoded sequences of the streams a, b, by subjecting the likelihood ratios to binary decision in the decision units 161, 162.

Therefore, according to the MIMO receiving apparatus, preferable receiving performance can be obtained since the replica signals based on the decoding result obtained by the provisional decision are fed back to the soft decision output units 151 to 154 and the actual decision is executed.

The LDPC decoding for the receive likelihood values is iterated until the updated amount of the likelihood ratios obtained by the LDPC decoding becomes equal to or smaller than a threshold value. The gain can be obtained with a good efficiency by the decoding. For this reason, undue iterating processes can be reduced at the decoding. In addition, the reception can be accelerated by decoding next streams with the LDPC decoders 431, 432 that have stopped iterated processing.

In addition, in the MIMO receiving apparatus, spatial correlation between the stream a and the stream b can be reduced since the LDPC decoding of the LDPC decoders 431, 432 employs different check matrices obtained by processing check matrices in fundamental row operation. For this reason, even if the propagation paths have correlation and the performance are not improved by iterating the conventional feedback, preferable error performance can be obtained. The modified check matrices P_a, P_b employed at the decoding of the LDPC decoders 431, 432 may be exchanged with each other as P_b, P_a or replaced with different modified check matrices P_c, P_d every time the feedback is iterated.

In the present embodiment, the replica signals are generated on the basis of the decision results of the decision units 161, 162. However, soft replica signals may be generated on the basis of the decoding results of the LDPC decoders 431, 432, similarly to the second embodiment.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the above-described embodiments employ the LDPC codes to encode the communication path. However, a communication path code which allows different decoding characteristics to be obtained by varying the check matrix irrespective of the generator matrix for encoding such as the LDPC codes, can also be applied to other encoding methods. In addition, the present invention can also be applied not only to the MIMO system but also the interference canceller technology in the CDMA system which urges signals of a plurality of users to be multiplexed with codes and then received.

The present invention can also be various modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiving apparatus employed in a Multi-Input Multi-Output (MIMO) system in which a first data sequence and a second data sequence are encoded with Low Density Parity Check (LDPC) codes and transmitted via different antennas, comprising:

a propagation path estimation unit configured to estimate propagation paths of a plurality of receive signals received via different antennas;

a space filtering unit configured to separate the receive signals to a signal of a first data sequence and a signal of a second data sequence on the basis of an estimation result of the propagation path estimation unit;

a provisional decoding unit configured to LDPC-decode the signal of the first data sequence and the signal of the second data sequence with check matrices which are modified in different forms by fundamental row operation from each other, to obtain a provisional likelihood ratio of the first data sequence and a provisional likelihood ratio of the second data sequence, respectively;

a provisional output unit configured to obtain a provisional first data sequence and a provisional second data sequence on the basis of the provisional likelihood ratio of the first data sequence and the provisional likelihood ratio of the second data sequence, respectively;

a replica signal generation unit configured to generate a replica signal, on the basis of the provisional first data sequence, the provisional second data sequence and the estimation result of the propagation path estimation unit;

a soft decision outputting unit configured to obtain receive likelihood values of the first data sequence and receive likelihood values of the second data sequence, respectively, on the basis of a residual signal obtained by subtracting the replica signal from the receive signals;

an actual decoding unit configured to LDPC-decode the receive likelihood values of the first data sequence and the second data sequence, with check matrices, respectively, to obtain a likelihood ratio of the first data sequence and a likelihood ratio of the second data sequence; and an actual output unit configured to obtain the first data sequence and the second data sequence on the basis of the likelihood ratio of the first data sequence and the likelihood ratio of the second data sequence generated by the actual decoding unit, respectively.

2. The receiving apparatus according to claim 1, wherein as an iterative decoding, the replica signal generation unit generates the replica signal on the basis of the first data sequence and the second data sequence obtained by the actual output unit and the estimation result of the propagation path estimation unit, the soft decision outputting unit obtains the receive likelihood values of the first data sequence and receive likelihood values of the second data sequence, respectively, on the basis of a residual signal obtained by subtracting the replica signal from the receive signals, the actual decoding unit LDPC-decode the receive likelihood values of the first data sequence and the second data sequence, with check matrices which are modified in different forms by fundamental row operation from each other, to obtain the likelihood ratio of the first data sequence and the likelihood ratio of the second data sequence, respectively, and the actual output unit obtains the first data sequence and the second data sequence, on the basis of the likelihood ratio of the first data sequence and the likelihood ratio of the second data sequence generated by the actual decoding unit, respectively; and every time the iterative decoding is iterated, the actual decoding unit LDPC-decodes the receive likelihood values with check matrices which are modified in different forms by fundamental row operation from each other.

3. The decoding apparatus according to claim 1, wherein the actual decoding unit obtains a likelihood ratio of the first data sequence and a likelihood ratio of the second data sequence, by iteratively LDPC-decoding the receive likelihood values with check matrices which are modified in different forms by fundamental row operation from each other.

4. The receiving apparatus according to claim 3, further comprising a measurement unit configured to measure RSSI values of the signal of the first data sequence and the signal of the second data sequence separated by the space filtering unit, respectively, wherein the actual decoding unit obtains the likelihood ratio of the first data sequence and the likelihood ratio of the second data sequence, by decoding the receive likelihood values by number of times corresponding to the RSSI values.

5. The receiving apparatus according to claim 3, further comprising a detection unit configured to compare the likelihood ratios obtained sequentially by decoding iterated by the actual decoding unit to obtain an updated amount of the likelihood ratios, wherein the actual decoding unit obtains the likelihood ratio of the first data sequence and the likelihood ratio of the second data sequence, by iterating the decoding in accordance with the updated amount detected by the detection unit.

6. The receiving apparatus according to claim 3, further comprising a detection unit configured to compare the likelihood ratios obtained sequentially by the decoding iterated by the actual decoding unit to obtain an updated amount of the likelihood ratios, wherein the actual decoding unit obtains the likelihood ratio of the first data sequence and the likelihood ratio of the second data sequence, by iterating the decoding until the updated amount detected by the detection unit becomes smaller than a preset threshold value.

7. A receiving apparatus employed in a Multi-Input Multi-Output (MIMO) system in which a first data sequence and a second data sequence are encoded with Low Density Parity Check (LDPC) codes and transmitted via different antennas, comprising:

a propagation path estimation unit configured to estimate propagation paths of a plurality of receive signals received via different antennas, using the receive signals;

a space filtering unit configured to separate the receive signals to a signal of a first data sequence and a signal of a second data sequence on the basis of an estimation result of the propagation path estimation unit;

a provisional decoding unit configured to LDPC-decode the signal of the first data sequence and the signal of the second data sequence with check matrices which are modified in different forms by fundamental row operation from each other, to obtain a provisional likelihood ratio of the first data sequence and a provisional likelihood ratio of the second data sequence, respectively;

a soft replica signal generation unit configured to generate a soft replica signal, on the basis of the provisional likelihood ratio of the first data sequence, the provisional likelihood ratio of the second data sequence and the estimation result of the propagation path estimation unit;

a soft decision outputting unit configured to obtain receive likelihood values of the first data sequence and receive likelihood values of the second data sequence, respectively, on the basis of a residual signal obtained by subtracting the soft replica signal from the receive signals;

an actual decoding unit configured to LDPC-decode the receive likelihood values of the first data sequence and the second data sequence, with check matrices, respectively, to obtain a likelihood ratio of the first data sequence and a likelihood ratio of the second data sequence; and a decision unit configured to obtain the first data sequence and the second data sequence on the basis of the likelihood ratio of the first data sequence and the likelihood ratio of the second data sequence generated by the actual decoding unit, respectively.

8. The receiving apparatus according to claim 7, wherein as an iterative decoding, the soft replica signal generation unit generates the soft replica signal on the basis of the likelihood values of the first data sequence and the likelihood values of the second data sequence obtained by the actual decoding unit and the estimation result of the propagation path estimation unit, the soft decision outputting unit obtains the receive likelihood values of the first data sequence and the receive likelihood values of the second data sequence, respectively, on the basis of a residual signal obtained by subtracting the soft replica signal from the receive signals, and the actual decoding unit LDPC-decode the receive likelihood values of the first data sequence and the second data sequence, with check matrices which are modified in different forms by fundamental row operation from each other, to obtain the likelihood ratio of the first data sequence and the likelihood ratio of the second data sequence, respectively, and every time the iterative decoding is iterated, the actual decoding unit LDPC-decodes the receive likelihood values with check matrices which are modified in different forms by fundamental row operation from each other.

9. The decoding apparatus according to claim 7, wherein the actual decoding unit obtains a likelihood ratio of the first data sequence and a likelihood ratio of the second data sequence, by iteratively LDPC-decoding the receive likelihood values with check matrices which are modified in different forms by fundamental row operation from each other.

10. The receiving apparatus according to claim 9, further comprising a measurement unit configured to measure RSSI values of the signal of the first data sequence and the signal of the second data sequence separated by the space filtering unit, respectively, wherein the actual decoding unit obtains the likelihood ratio of the first data sequence and the likelihood ratio of the second data sequence, by decoding the receive likelihood values by number of times corresponding to the RSSI values.

11. The receiving apparatus according to claim 9, further comprising a detection unit configured to compare the likelihood ratios obtained sequentially by decoding iterated by the actual decoding unit to obtain an updated amount of the likelihood ratios, wherein the actual decoding unit obtains the likelihood ratio of the first data sequence and the likelihood ratio of the second data sequence, by iterating the decoding in accordance with the updated amount detected by the detection unit.

12. The receiving apparatus according to claim 9, further comprising a detection unit configured to compare the likelihood ratios obtained sequentially by the decoding iterated by the actual decoding unit to obtain an updated amount of the likelihood ratios, wherein the actual decoding unit obtains the likelihood ratio of the first data sequence and the likelihood ratio of the second data sequence, by iterating the decoding until the updated amount detected by the detection unit becomes smaller than a preset threshold value.

13. A demodulating method employed in a Multi-Input Multi-Output (MIMO) system in which a first data sequence and a second data sequence are encoded with Low Density Parity Check (LDPC) codes and transmitted via different antennas, comprising:

(a) estimating propagation paths of a plurality of receive signals received via different antennas;

(b) separating the receive signals to a signal of a first data sequence and a signal of a second data sequence on the basis of an estimation result of the step (a);

(c) LDPC-decoding the signal of the first data sequence and the signal of the second data sequence with check matrices which are modified in different forms by fundamental row operation from each other, to obtain a provisional likelihood ratio of the first data sequence and a provisional likelihood ratio of the second data sequence, respectively;

(d) obtaining a provisional first data sequence and a provisional second data sequence on the basis of the provisional likelihood ratio of the first data sequence and the provisional likelihood ratio of the second data sequence, respectively;

(e) generating a replica signal, on the basis of the provisional first data sequence, the provisional second data sequence and the estimation result of the step (a);

(f) obtaining receive likelihood values of the first data sequence and receive likelihood values of the second data sequence, respectively, on the basis of a residual signal obtained by subtracting the replica signal from the receive signals;

(g) LDPC-decoding the receive likelihood values of the first data sequence and the second data sequence, with check matrices, respectively, to obtain a likelihood ratio of the first data sequence and a likelihood ratio of the second data sequence; and (h) obtaining the first data sequence and the second data sequence on the basis of the likelihood ratio of the first data sequence and the likelihood ratio of the second data sequence generated by the actual decoding unit, respectively.

14. The demodulating method according to claim 13, wherein as an iterative decoding, the step (e) of generating the replica signal on the basis of the first data sequence and the second data sequence obtained in the step (h) and the estimation result of the step (a), the step (f) of obtaining the receive likelihood values of the first data sequence and receive likelihood values of the second data sequence, respectively, on the basis of a residual signal obtained by subtracting the replica signal from the receive signals, the step (g) of LDPC-decoding the receive likelihood values of the first data sequence and the second data sequence, with check matrices which are modified in different forms by fundamental row operation from each other, and obtains the likelihood ratio of the first data sequence and the likelihood ratio of the second data sequence, respectively, and the step (h) of obtaining the first data sequence and the second data sequence, on the basis of the likelihood ratio of the first data sequence and the likelihood ratio of the second data sequence generated by the step (g), respectively, are iterated; and every time the iterative decoding is iterated, the LDPC-decoding is executed with the check matrices, in the step (g).

15. The demodulating method according to claim 13, wherein in the step (g), the likelihood ratio of the first data sequence and the likelihood ratio of the second data sequence are obtained by iteratively LDPC-decoding the receive likelihood values with check matrices which are modified in different forms by fundamental row operation from each other.

16. The demodulating method according to claim 15, further comprising
(i) measuring RSSI values of the signal of the first data sequence and the signal of the second data sequence separated in the step (b), respectively,
wherein in the step (g), the likelihood ratio of the first data sequence and the likelihood ratio of the second data sequence are obtained by decoding the receive likelihood values by number of times corresponding to the RSSI values.

17. The demodulating method according to claim 15, further comprising
(j) comparing the likelihood ratios obtained sequentially by decoding iterated in the step (g) to obtain an updated amount of the likelihood ratios,
wherein in the step (g), the likelihood ratio of the first data sequence and the likelihood ratio of the second data sequence are obtained by iterating the decoding in accordance with the updated amount detected in the step (j).

18. The demodulating method according to claim 15, further comprising
(j) comparing the likelihood ratios obtained sequentially by the decoding iterated in the step (g) to obtain an updated amount of the likelihood ratios,
wherein in the step (g), the likelihood ratio of the first data sequence and the likelihood ratio of the second data sequence are obtained by iterating the decoding until the updated amount detected in the step (j) becomes smaller than a preset threshold value.

19. A demodulating method employed in a Multi-Input Multi-Output (MIMO) system in which a first data sequence and a second data sequence are encoded with Low Density Parity Check (LDPC) codes and transmitted via different antennas, comprising:

(a) estimating propagation paths of a plurality of receive signals received via different antennas, using the receive signals;
(b) separating the receive signals to a signal of a first data sequence and a signal of a second data sequence on the basis of an estimation result of the step (a);
(c) LDPC-decoding the signal of the first data sequence and the signal of the second data sequence with check matrices which are modified in different forms by fundamental row operation from each other, to obtain a provisional likelihood ratio of the first data sequence and a provisional likelihood ratio of the second data sequence, respectively;
(d) generating a soft replica signal, on the basis of the provisional likelihood ratio of the first data sequence, the provisional likelihood ratio of the second data sequence and the estimation result of the step (a);
(e) obtaining receive likelihood values of the first data sequence and receive likelihood values of the second data sequence, respectively, on the basis of a residual signal obtained by subtracting the soft replica signal from the receive signals;
(f) LDPC-decoding the receive likelihood values of the first data sequence and the second data sequence, with check matrices, respectively, to obtain a likelihood ratio of the first data sequence and a likelihood ratio of the second data sequence; and
(g) obtaining the first data sequence and the second data sequence on the basis of the likelihood ratio of the first data sequence and the likelihood ratio of the second data sequence generated by the actual decoding unit, respectively.

20. The demodulating method according to claim 19, wherein as an iterative decoding, the step (d) of generating the soft replica signal on the basis of the likelihood values of the first data sequence and the likelihood values of the second data sequence obtained in the step (f) and the estimation result of the step (a), the step (e) of obtaining the receive likelihood values of the first data sequence and the receive likelihood values of the second data sequence, respectively, on the basis of a residual signal obtained by subtracting the soft replica signal from the receive signals, and the step (f) of LDPC-decoding the receive likelihood values of the first data sequence and the second data sequence, with check matrices which are modified in different forms by fundamental row operation from each other, to obtain the likelihood ratio of the first data sequence and the likelihood ratio of the second data sequence, respectively, are iterated; and every time the iterative decoding is iterated, the LDPC-decoding is executed with check matrices which are modified in different forms by fundamental row operation from each other, in the step (f).

21. The demodulating method according to claim 19, wherein in the step (f), a likelihood ratio of the first data sequence and a likelihood ratio of the second data sequence are obtained by iterating the LDPC decoding the receive likelihood values with check matrices which are modified in different forms by fundamental row operation from each other.

22. The demodulating method according to claim 21, further comprising
(h) measuring RSSI values of the signal of the first data sequence and the signal of the second data sequence separated in the step (b), respectively,
wherein in the step (f), the likelihood ratio of the first data sequence and the likelihood ratio of the second data sequence are obtained by executing the decoding the receive likelihood values by a number of times corresponding to the RSSI values.

23. The demodulating method according to claim 21, further comprising
(h) comparing the likelihood ratios obtained sequentially by the decoding iterated in the step (f) to obtain an updated amount of the likelihood ratios,
wherein in the step (f), the likelihood ratio of the first data sequence and the likelihood ratio of the second data sequence are obtained by iterating the decoding in accordance with the updated amount obtained in the step (h).

24. The demodulating method according to claim 21, further comprising
(h) comparing the likelihood ratios obtained sequentially by the decoding iterated in the step (f) to obtain an updated amount of the likelihood ratios,
wherein in the step (f), the likelihood ratio of the first data sequence and the likelihood ratio of the second data sequence are obtained by iterating the decoding until the updated amount obtained in the step (h) becomes smaller than a preset threshold value.

* * * * *